(12) United States Patent
Carnevali

(10) Patent No.: US 11,652,326 B2
(45) Date of Patent: May 16, 2023

(54) DOCK WITH FLEXIBLE LOCATOR PINS AND METHODS OF MAKING AND USING

(71) Applicant: National Products, Inc., Seattle, WA (US)

(72) Inventor: Jeffrey D. Carnevali, Seattle, WA (US)

(73) Assignee: National Products, Inc., Seattle, WA (US)

( * ) Notice: Subject to any disclaimer, the term of this patent is extended or adjusted under 35 U.S.C. 154(b) by 61 days.

(21) Appl. No.: 17/246,003

(22) Filed: Apr. 30, 2021

(65) Prior Publication Data

US 2022/0352682 A1 Nov. 3, 2022

(51) Int. Cl.
| | |
|---|---|
| H01R 13/60 | (2006.01) |
| H01R 33/94 | (2006.01) |
| H01R 13/631 | (2006.01) |
| G06F 1/16 | (2006.01) |
| H01R 13/52 | (2006.01) |
| H01R 12/57 | (2011.01) |

(52) U.S. Cl.
CPC ........... *H01R 33/94* (2013.01); *G06F 1/1632* (2013.01); *H01R 12/57* (2013.01); *H01R 13/5213* (2013.01); *H01R 13/631* (2013.01)

(58) Field of Classification Search
CPC .. H01R 12/57; H01R 13/5213; H01R 13/631; H01R 33/94; G06F 1/1632
USPC ........................................................ 439/533
See application file for complete search history.

(56) References Cited

U.S. PATENT DOCUMENTS

| | | | |
|---|---|---|---|
| 809,977 | A | 1/1906 | O'Brien |
| 1,786,459 | A | 7/1926 | Simons |
| 2,495,552 | A | 1/1950 | Schmitz |
| 2,549,917 | A | 4/1951 | Millbrandt |
| 2,565,939 | A | 8/1951 | Wriston |

(Continued)

FOREIGN PATENT DOCUMENTS

| | | |
|---|---|---|
| CN | 1312603 | 9/2001 |
| CN | 101674096 | 3/2010 |

(Continued)

OTHER PUBLICATIONS

Otterbox Product directory, 20 pages of product description of Otter Box waterproof boxes retrieved from web site at www.otterbox.com Dated Sep. 2, 2005. Otter Products, LLC, Bldg. 1 Old-Town Square, Suite 303, Fort Collins, CO 80524 Phone: 1-888-695-8820, 970-493-8446; Facsimile: 1-888-695-8827, 970-493-1755.

(Continued)

*Primary Examiner* — Abdullah A Riyami
*Assistant Examiner* — Vladimir Imas
(74) *Attorney, Agent, or Firm* — Branch Partners PLLC; Bruce E. Black

(57) ABSTRACT

A dock for an electronic device includes a base configured to fit over at least a portion of a back surface of the electronic device; a tray extending from the base for receiving one side of the electronic device and extending over a portion of the front surface of the electronic device; a contact box attached to at least one of the base or the tray; contacts extending from the contact box through one or more openings in the tray; and at least one guide pin extending from the contact box through one or more openings in the tray, where each of the at least one guide pin is elastomeric.

20 Claims, 3 Drawing Sheets

(56) References Cited

U.S. PATENT DOCUMENTS

| | | | |
|---|---|---|---|
| 2,612,947 A | 10/1952 | Jenks | |
| 2,717,093 A | 9/1955 | Mautner | |
| 2,803,368 A | 8/1957 | Koch | |
| 3,018,525 A | 1/1962 | Deisenroth | |
| 3,140,883 A | 7/1964 | Anthony | |
| 3,464,579 A | 9/1969 | Asenbauer | |
| 3,667,648 A | 6/1972 | Koziol | |
| 3,885,701 A | 5/1975 | Becklin | |
| 3,972,459 A | 8/1976 | Cooper | |
| 3,978,830 A | 9/1976 | Toth, Jr. | |
| 4,298,204 A | 11/1981 | Jinkins | |
| 4,564,880 A | 1/1986 | Christ et al. | |
| 4,607,772 A | 7/1986 | Hancock | |
| 4,828,558 A | 5/1989 | Kelman | |
| 4,842,174 A | 6/1989 | Sheppard et al. | |
| 4,848,319 A | 7/1989 | Appeldorn | |
| 5,002,184 A | 3/1991 | Lloyd | |
| 5,096,317 A | 3/1992 | Phillippe | |
| 5,135,189 A | 8/1992 | Ghazizadeh | |
| 5,246,133 A | 9/1993 | James | |
| 5,272,771 A | 12/1993 | Ansell et al. | |
| 5,295,602 A | 3/1994 | Swanson | |
| 5,353,934 A | 10/1994 | Yamauchi | |
| 5,457,745 A | 10/1995 | Wang | |
| 5,535,274 A | 7/1996 | Braitberg et al. | |
| 5,584,054 A | 12/1996 | Tyneski et al. | |
| 5,586,002 A | 12/1996 | Notarianni | |
| 5,641,065 A | 6/1997 | Owens et al. | |
| 5,646,649 A | 7/1997 | Iwata et al. | |
| 5,791,506 A | 8/1998 | Sheffler et al. | |
| 5,813,096 A | 9/1998 | Soennichsen | |
| 5,822,427 A | 10/1998 | Braitberg et al. | |
| 5,842,670 A | 12/1998 | Nigoghosian | |
| 5,845,885 A | 12/1998 | Carnevali | |
| 5,860,550 A | 1/1999 | Miller et al. | |
| 5,888,087 A * | 3/1999 | Hanson | G06F 1/3203 439/297 |
| 5,895,018 A | 4/1999 | Rielo | |
| 5,953,795 A | 9/1999 | Bauer | |
| 5,969,057 A | 10/1999 | Schoeley et al. | |
| 5,990,874 A | 11/1999 | Tsumura et al. | |
| 5,992,807 A | 11/1999 | Tarulli | |
| 6,009,601 A | 1/2000 | Kaufman | |
| 6,010,005 A | 1/2000 | Reames et al. | |
| 6,032,910 A | 3/2000 | Richter | |
| 6,034,505 A | 3/2000 | Arthur et al. | |
| 6,035,800 A | 3/2000 | Clifford | |
| 6,043,626 A | 3/2000 | Snyder et al. | |
| 6,068,119 A | 5/2000 | Derr et al. | |
| 6,149,116 A | 11/2000 | Won | |
| 6,191,943 B1 | 2/2001 | Tracy | |
| 6,229,893 B1 | 5/2001 | Chen | |
| 6,273,773 B1 | 8/2001 | Bourke | |
| 6,276,552 B1 | 8/2001 | Vervisch | |
| 6,295,198 B1 | 9/2001 | Loh et al. | |
| 6,341,218 B1 | 1/2002 | Poplawsky et al. | |
| 6,356,053 B1 | 3/2002 | Sandoz et al. | |
| 6,377,825 B1 | 4/2002 | Kennedy et al. | |
| 6,406,758 B1 | 6/2002 | Bottari et al. | |
| 6,407,860 B1 | 6/2002 | Funazaki et al. | |
| 6,438,229 B1 | 8/2002 | Overy et al. | |
| 6,561,476 B2 | 5/2003 | Carnevali | |
| 6,572,176 B2 | 6/2003 | Davies et al. | |
| 6,585,212 B2 | 7/2003 | Carnevali | |
| 6,588,637 B2 | 7/2003 | Gates et al. | |
| 6,597,924 B1 | 7/2003 | Smith | |
| 6,614,423 B1 | 9/2003 | Wong et al. | |
| 6,646,864 B2 | 11/2003 | Richardson | |
| 6,648,376 B2 | 11/2003 | Christianson | |
| 6,687,516 B2 | 2/2004 | Chen | |
| 6,702,604 B1 | 3/2004 | Moscovitch | |
| 6,754,343 B2 | 6/2004 | Lundstrom et al. | |
| 6,762,585 B2 | 7/2004 | Liao | |
| 6,776,422 B1 | 8/2004 | Toy | |
| 6,785,566 B1 | 8/2004 | Irizarry | |
| 6,785,567 B2 | 8/2004 | Kato | |
| 6,816,713 B2 | 11/2004 | Chen | |
| 6,842,171 B2 | 1/2005 | Richter et al. | |
| 6,953,126 B2 | 10/2005 | Parker et al. | |
| 6,984,680 B2 | 1/2006 | Quinn | |
| 6,995,976 B2 | 2/2006 | Richardson | |
| 7,017,243 B2 | 3/2006 | Carnevali | |
| 7,031,148 B1 | 4/2006 | Lin | |
| 7,068,783 B2 | 6/2006 | Peiker | |
| 7,158,376 B2 | 1/2007 | Richardson et al. | |
| 7,180,735 B2 | 2/2007 | Thomas et al. | |
| 7,203,058 B2 | 4/2007 | Hong | |
| 7,230,823 B2 | 6/2007 | Richardson et al. | |
| 7,248,901 B2 | 7/2007 | Peiker | |
| 7,257,429 B2 | 8/2007 | Kogan | |
| 7,283,849 B2 | 10/2007 | Peiker | |
| 7,311,526 B2 * | 12/2007 | Rohrbach | G06F 1/18 439/39 |
| 7,312,984 B2 | 12/2007 | Richardson et al. | |
| 7,351,066 B2 * | 4/2008 | DiFonzo | H01R 13/6205 439/39 |
| 7,464,814 B2 * | 12/2008 | Carnevali | G06F 1/1626 455/575.8 |
| 7,480,138 B2 | 1/2009 | Kogan et al. | |
| 7,481,664 B1 | 1/2009 | Knoll et al. | |
| 7,517,222 B2 | 4/2009 | Rohrbach et al. | |
| 7,520,389 B2 | 4/2009 | Lalouette | |
| 7,551,458 B2 | 6/2009 | Carnevali | |
| 7,566,224 B2 | 7/2009 | Wu | |
| 7,594,576 B2 | 9/2009 | Chen et al. | |
| 7,609,512 B2 | 10/2009 | Richardson et al. | |
| 7,612,997 B1 * | 11/2009 | Diebel | G06F 1/1632 361/679.41 |
| 7,641,477 B2 | 1/2010 | DiFonzo et al. | |
| 7,645,143 B2 | 1/2010 | Rohrbach et al. | |
| 7,663,879 B2 | 2/2010 | Richardson et al. | |
| 7,688,580 B2 | 3/2010 | Richardson et al. | |
| 7,812,567 B2 | 10/2010 | Shen | |
| 7,841,776 B2 | 11/2010 | DiFonzo et al. | |
| 7,850,032 B2 * | 12/2010 | Carnevali | B63B 49/00 206/811 |
| 7,855,529 B2 | 12/2010 | Liu | |
| RE42,060 E | 1/2011 | Carnevali | |
| 7,889,489 B2 | 2/2011 | Richardson et al. | |
| 7,901,216 B2 | 3/2011 | Rohrbach et al. | |
| 7,907,394 B2 * | 3/2011 | Richardson | G06F 1/1613 361/679.02 |
| 7,970,440 B2 | 6/2011 | Bury | |
| RE42,581 E | 8/2011 | Carnevali | |
| 7,997,554 B2 | 8/2011 | Carnevali | |
| 8,061,516 B2 | 11/2011 | Carnevali | |
| 8,074,951 B2 | 12/2011 | Carnevali | |
| 8,087,939 B2 | 1/2012 | Rohrbach et al. | |
| 8,099,138 B2 | 1/2012 | Piekarz | |
| 8,172,580 B1 | 5/2012 | Chen et al. | |
| 8,177,560 B2 | 5/2012 | Rohrbach et al. | |
| 8,183,825 B2 | 5/2012 | Sa | |
| 8,224,408 B2 | 7/2012 | Tomasini et al. | |
| RE43,806 E | 11/2012 | Carnevali | |
| 8,390,255 B1 | 3/2013 | Fathollahi | |
| 8,405,974 B2 | 3/2013 | Sayavong | |
| 8,414,312 B2 | 4/2013 | Hung et al. | |
| 8,435,042 B2 | 5/2013 | Rohrbach et al. | |
| 8,453,835 B2 | 6/2013 | So | |
| 8,454,178 B2 | 6/2013 | Carnevali | |
| 8,483,758 B2 | 7/2013 | Huang | |
| 8,497,753 B2 | 7/2013 | DiFonzo et al. | |
| 8,505,861 B2 | 8/2013 | Carnevali | |
| 8,560,014 B1 | 10/2013 | Hu et al. | |
| 8,634,887 B2 | 1/2014 | Hu et al. | |
| 8,639,288 B1 | 1/2014 | Friedman | |
| 8,646,698 B2 | 2/2014 | Chen et al. | |
| 8,690,582 B2 | 4/2014 | Rohrbach et al. | |
| 8,729,854 B2 | 5/2014 | Tsai et al. | |
| 8,760,311 B2 | 6/2014 | Heaton | |
| 8,763,802 B2 | 7/2014 | Ellis-Brown | |
| 8,801,441 B2 * | 8/2014 | Zhang | H01R 13/633 439/131 |
| 8,825,123 B1 | 9/2014 | Gudino | |

(56) References Cited

U.S. PATENT DOCUMENTS

| | | | |
|---|---|---|---|
| 8,833,716 | B2 | 9/2014 | Funk et al. |
| 8,891,800 | B1 | 11/2014 | Shaffer |
| 8,907,783 | B2 | 12/2014 | Fish et al. |
| 8,911,246 | B2 | 12/2014 | Carnevali |
| 8,929,065 | B2* | 1/2015 | Williams ............... G06F 1/1632 361/679.41 |
| 8,950,717 | B2 | 2/2015 | Chuang |
| 8,970,332 | B2 | 3/2015 | DiFonzo et al. |
| 9,026,187 | B2 | 5/2015 | Huang |
| 9,071,060 | B2 | 6/2015 | Fathollahi |
| 9,072,172 | B2 | 6/2015 | Hsu |
| 9,112,304 | B2 | 8/2015 | Rohrbach et al. |
| 9,123,935 | B2 | 9/2015 | Huang |
| 9,147,966 | B2 | 9/2015 | An |
| 9,172,781 | B1 | 10/2015 | Goldstein |
| 9,331,444 | B2* | 5/2016 | Carnevali ............. G06F 1/1628 |
| 9,356,267 | B1* | 5/2016 | To ......................... H01M 50/24 |
| 9,602,639 | B2 | 3/2017 | Carnevali |
| 9,647,474 | B2 | 5/2017 | Fathollahi et al. |
| 9,776,577 | B2 | 10/2017 | Carnevali |
| 9,807,211 | B2 | 10/2017 | Guerdrum et al. |
| 9,817,441 | B1* | 11/2017 | Kuo ................... H01R 13/4534 |
| 9,831,904 | B1 | 11/2017 | Carnevali |
| 9,924,005 | B1 | 3/2018 | McElderry |
| 10,172,246 | B2 | 1/2019 | Apter |
| 10,330,251 | B2 | 6/2019 | Carnevali |
| 10,401,905 | B2* | 9/2019 | Carnevali ............. G06F 1/1626 |
| 10,788,857 | B2* | 9/2020 | Huang ................ E05B 73/0082 |
| 11,029,731 | B1 | 6/2021 | Carnevali |
| 11,076,032 | B1 | 7/2021 | Carnevali |
| 2002/0009194 | A1 | 1/2002 | Wong et al. |
| 2002/0191782 | A1 | 12/2002 | Beger et al. |
| 2003/0116631 | A1 | 6/2003 | Salvato et al. |
| 2004/0108348 | A1 | 6/2004 | Barnes |
| 2005/0189354 | A1 | 9/2005 | Heather et al. |
| 2006/0058073 | A1 | 3/2006 | Kim |
| 2006/0175766 | A1* | 8/2006 | Carnevali ............... B63B 49/00 277/628 |
| 2008/0149796 | A1 | 6/2008 | Moscovitch |
| 2009/0160400 | A1 | 6/2009 | Woud |
| 2009/0314400 | A1 | 12/2009 | Liu |
| 2012/0018325 | A1 | 1/2012 | Kim |
| 2012/0043235 | A1 | 2/2012 | Klement |
| 2012/0118773 | A1 | 5/2012 | Rayner |
| 2012/0211382 | A1 | 8/2012 | Rayner |
| 2012/0250270 | A1 | 10/2012 | Liu |
| 2012/0261306 | A1 | 10/2012 | Richardson et al. |
| 2012/0298536 | A1 | 11/2012 | Rauta et al. |
| 2013/0092576 | A1 | 4/2013 | Rayner |
| 2013/0106353 | A1 | 5/2013 | Foster |
| 2013/0193006 | A1 | 8/2013 | Bergreen et al. |
| 2013/0220841 | A1 | 8/2013 | Yang |
| 2013/0258573 | A1 | 10/2013 | Muday et al. |
| 2013/0273752 | A1 | 10/2013 | Rudisill et al. |
| 2013/0273983 | A1 | 10/2013 | Hsu |
| 2013/0331156 | A1 | 12/2013 | Lui |
| 2013/0334071 | A1 | 12/2013 | Carnevali |
| 2014/0042285 | A1 | 2/2014 | Carnevali |
| 2014/0347000 | A1 | 11/2014 | Hamann et al. |
| 2014/0363988 | A1 | 12/2014 | An |
| 2015/0055289 | A1 | 2/2015 | Chang et al. |
| 2015/0146401 | A1* | 5/2015 | Su ........................ G06F 1/1632 361/807 |
| 2015/0189780 | A1* | 7/2015 | Su ........................... H05K 5/03 361/807 |
| 2016/0065702 | A1 | 3/2016 | Carnevali |
| 2016/0231779 | A1 | 8/2016 | Kaneko et al. |
| 2017/0054312 | A1 | 2/2017 | Kuchynka et al. |
| 2017/0227987 | A1 | 8/2017 | Carnevali et al. |
| 2018/0279809 | A1 | 10/2018 | Regan et al. |
| 2020/0371555 | A1* | 11/2020 | Huang ................ E05B 73/0082 |
| 2021/0194256 | A1 | 6/2021 | Carnevali |

FOREIGN PATENT DOCUMENTS

| | | |
|---|---|---|
| CN | 202268924 | 6/2012 |
| CN | 202565335 | 11/2012 |
| CN | 204334055 | 5/2015 |
| CN | 204334674 | 5/2015 |
| CN | 204408423 | 6/2015 |
| JP | 2004-349969 | 12/2004 |
| JP | 2014-75327 | 4/2014 |
| KR | 20-0265673 | 2/2002 |
| KR | 10-1078214 | 11/2011 |
| TW | 2003TW531119 | 5/2003 |
| TW | M422808 | 2/2012 |
| WO | 2012/052751 | 4/2012 |
| WO | 2013/081222 | 6/2013 |
| WO | 2014/054426 | 4/2014 |
| WO | 2015/022675 | 2/2015 |

OTHER PUBLICATIONS

Officeonthego.com, 3 pages of product description of Magnifico® PLUS screen magnifier product information retrieved from web site at: www.officeonthego.com.

2 pages of product information for Armor 1600 and Armor 1601 waterproof, dustproof and airtight protective cases.

2 pages Otterox 4600 Tablet PC Case protective cases product information retrieved from web site at: www.otterbox.com.

Jason Poel Smith: "How to Transplant RFID Chips", Sep. 3, 2013 (Sep. 3, 2013), XP55492991, Retrieved from the Internet: URL: http://www.instructables.com/id/How-to-Transplant-RFID-Chips/ [retrieved on Jul. 17, 2018].

* cited by examiner

DOCK WITH FLEXIBLE LOCATOR PINS AND METHODS OF MAKING AND USING

FIELD

The present invention is directed to a dock for an electronic device. The present invention is also directed to a dock with flexible locating pins for insertion of a device into the dock.

BACKGROUND

Mobile devices, such as smartphones, cellular or mobile phones, tablets, personal data assistants, and other portable devices, are now ubiquitous. Docks can be used to protect the mobile device, to couple the mobile device to a source of power or data, or to mount the mobile device onto a surface or object or any combination thereof.

BRIEF SUMMARY

One embodiment is a dock for an electronic device that includes a base configured to fit over at least a portion of a back surface of the electronic device; a tray extending from the base for receiving one side of the electronic device; a contact box attached to at least one of the base or the tray; contacts extending from the contact box through one or more openings in the tray; and at least one guide pin extending from the contact box through one or more openings in the tray, wherein each of the at least one guide pin is elastomeric.

In at least some embodiments, the dock further includes a printed circuit board (PCB), wherein the contacts are attached to the PCB. In at least some embodiments, each of the at least one guide pin is not attached to the PCB.

In at least some embodiments, the dock further includes at least one support structure, wherein each of the at least one support structure is attached to a different one of the at least one guide pin. In at least some embodiments, the support structure is elastomeric. In at least some embodiments, the support structure is hollow. In at least some embodiments, the contact box includes a cover. In at least some embodiments, the cover of the contact box, when attached to the contact box, presses against the at least one support structure to facilitate extension of the at least one guide pin from the contact box. In at least some embodiments, the dock further includes a printed circuit board (PCB), wherein the contacts are attached to the PCB, wherein the cover of the contact box, when attached to the contact box, presses against the PCB to facilitate extension of the contacts from the contact box.

In at least some embodiments, each of the at least one guide pin is made of polyurethane. In at least some embodiments, each of the at least one guide pin is made of an elastomer having a durometer in a range of 40 to 90 Shore A.

Another embodiment is a dock for an electronic device that includes a base configured to fit over at least a portion of a back surface of the electronic device; a tray extending from the base for receiving one side of the electronic device; a contact box attached to at least one of the base or the tray; a printed circuit board (PCB) disposed within the contact box; contacts attached to the PCB and extending from the contact box through one or more openings in the tray; and at least one guide pin extending from the contact box through one or more openings in the tray, wherein each of the at least one guide pin is not attached to the PCB.

In at least some embodiments, the dock further includes at least one support structure, wherein each of the at least one support structure is attached to a different one of the at least one guide pin. In at least some embodiments, the support structure is elastomeric. In at least some embodiments, the support structure is hollow. In at least some embodiments, the contact box includes a cover. In at least some embodiments, the cover of the contact box, when attached to the contact box, presses against the at least one support structure to facilitate extension of the at least one guide pin from the contact box. In at least some embodiments, the cover of the contact box, when attached to the contact box, presses against the PCB to facilitate extension of the contacts from the contact box.

In at least some embodiments, each of the at least one guide pin is made of polyurethane. In at least some embodiments, each of the at least one guide pin is made of an elastomer having a durometer in a range of 40 to 90 Shore A.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to a dock for an electronic device. The present invention is also directed to a dock with a module receptacle.

Figure 1A:
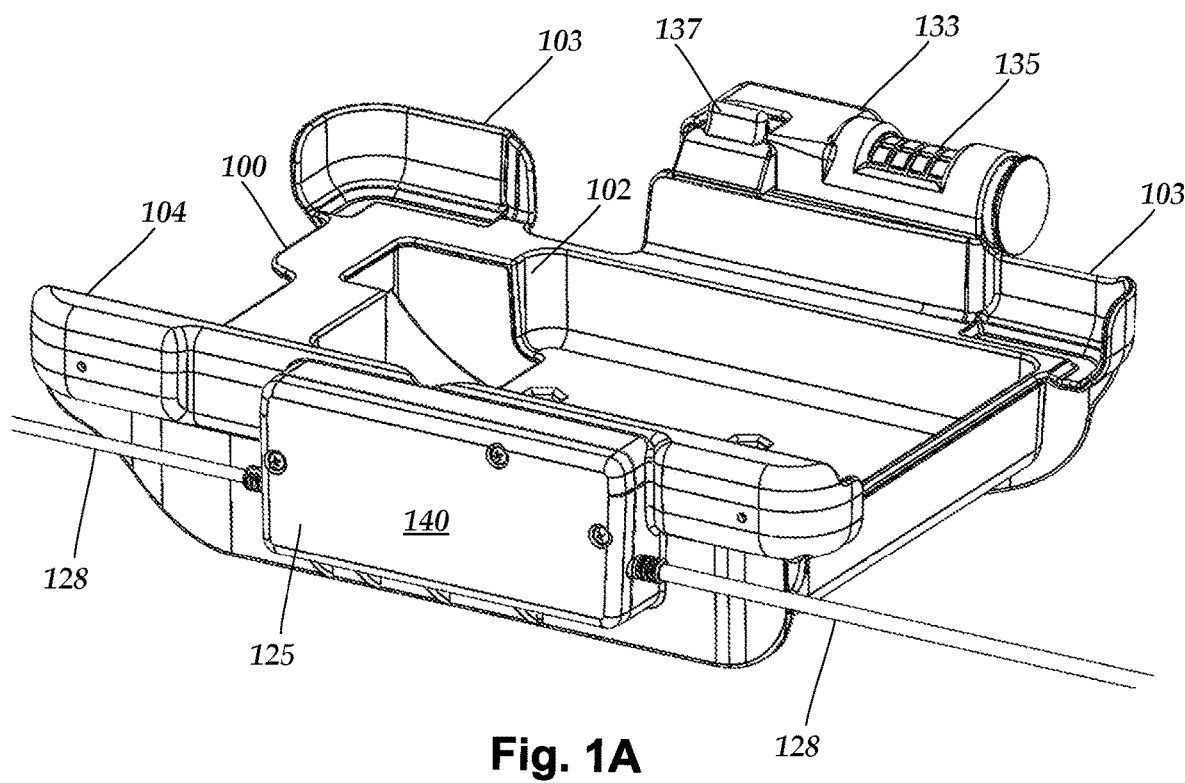
FIG. 1A is a schematic perspective bottom side view of one embodiment of a dock, according to the invention.
Figure 1B:
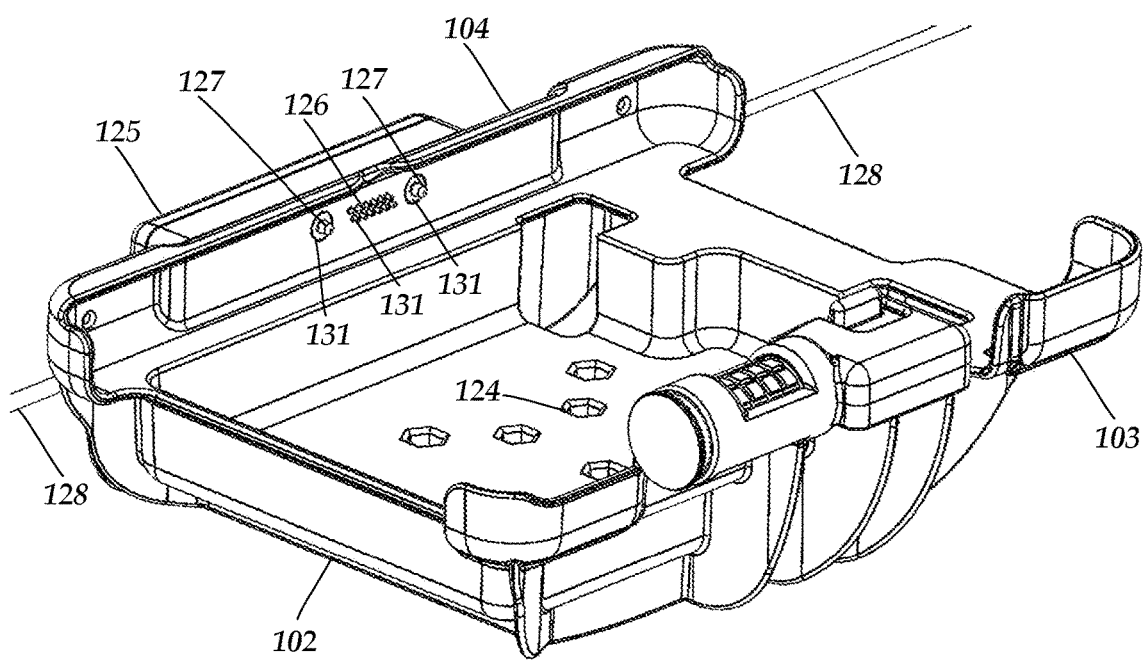
FIG. 1B is a schematic perspective top side view of the dock of FIG. 1A, according to the invention.
Figure 2:
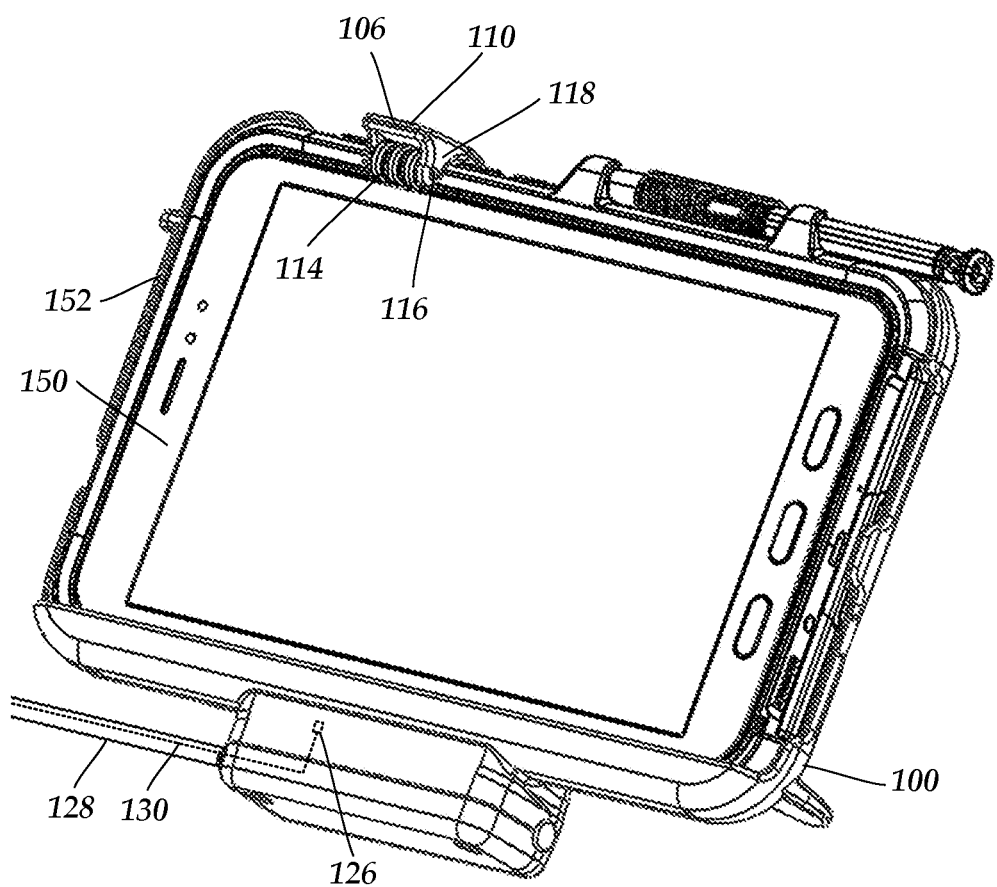
FIG. 2 is a schematic perspective front view of another embodiment of a dock with an electronic device in a case disposed in the dock, according to the invention.

FIGS. 1A and 1B illustrate one embodiment of a dock 100. The dock 100 can receive an electronic device that is optionally disposed in a case. FIG. 2 illustrates another embodiment of a dock 100' that is removably attachable to an electronic device 150 that is optionally disposed in a case 152. The electronic device 150 can be any suitable portable device such as, but not limited to, a mobile phone (e.g., a cellphone or a smartphone), a tablet, a personal data assistant, a laptop computer, or the like. In at least some embodiments, the dock 100 is designed, sized, or arranged for a specific type(s) or model(s) of electronic device(s) 150.

Returning to FIGS. 1A and 1B, the dock 100 includes a base 102 that is arranged to be disposed beneath the electronic device 150 and a tray 104 extending from the base 102 for receiving one side of the case 152 and electronic device 150 (see, FIG. 2). In at least some embodiments, the tray 104 extends over a portion of the front surface of the electronic device (see, FIG. 2.) In at least some embodiments, the dock 100 may also include one or more retaining sidewalls 103 that fit around one or more sides of the electronic device 150, for example, to facilitate protection, alignment, or retention of the electronic device in the dock. In at least some embodiments, the base 102, tray, 104, or sidewall 103 can include one or more grooves, ridges, tabs, or tab-receiving openings to facilitate retention of the electronic device 150 (optionally with the case 152) in the dock 100.

In at least some embodiments, as illustrated in FIGS. 1A and 1B, the dock 100 can include a locking mechanism 133 with a lock 135 and a sliding tab 137 that can fit over a portion of the front surface of the electronic device 150 to hold the electronic device in the dock. In at least some other embodiments, as illustrated in FIG. 2, the dock 100 can include an attachment arm 106 extending from the base for retaining the electronic device 150 in the dock. The attachment arm 106 has a back cover engagement portion (not shown), a front cover engagement portion 110, and a cover width portion 112 extending between the back cover and front cover engagement portions. In at least some embodiments, the front cover engagement portion 110 includes a roller 114 which can roll on an axle 116 held by two legs 118 to facilitate retention of the electronic device 150 in the dock 100. Examples of docks with attachment arms can be found in U.S. patent application Ser. Nos. 16/298,952 and 17/174,152, both of which are incorporated herein by reference in their entireties.

In at least some embodiments, one or more accessories are attached or attachable to the dock 100. Example of such accessories include, but are not limited to, a mount, a fan, or the like or any combination thereof. In at least some embodiments, the dock 100 includes a mounting arrangement (not shown) having multiple attachment apertures 124 (FIG. 1B) for receiving a fastener to attach a mount to the mounting arrangement. The mount can be any suitable mount that can be attached to a mounting device. Non-limiting examples of mounts, mounting arrangements, and mounting devices can be found at, for example, U.S. Pat. Nos. 5,845,885; 6,561,476; 7,320,50; 7,997,554; 8,454,178; 8,505,861; 9,831,904; RE42,060; RE42,581; and RE43,806 and U.S. patent application Ser. Nos. 16/298,952 and 17/174,152, all of which are incorporated herein by reference in their entireties.

The dock 100 also includes a contact box 125 attached to the tray 104 or base 102 (or both) of the dock. One or more contacts 126 and one or more guide pins 127 extend out of the contact box 125 through openings 131 in the tray 104, as illustrated in FIG. 1B. The contacts are configured to couple to contacts on the case 152 or electronic device 150. The contacts 126 may be suitable for delivering power, data, or the like to the electronic device 150. The dock 100 can include any number of contacts 126 such as, for example, one, two, four, six, eight, ten, twelve, sixteen or more contacts. Any type of contact 126 can be used including, but not limited to, stationary contacts, pogo pins, other movable contacts, pins, or the like or any combination thereof.

The contacts 126 are coupled to wires 130 (FIG. 2—only one of the wires 130 is shown) or other conductors that are carried, in part, by at least one cord 128 that extends from the contact box 125 of the dock 100. The cord 128 may have a connector at the other end or may be hardwired or hardwireable into another device that can provide the power, data, or the like. A dock can include multiple (e.g., two or more) cords 128, as illustrated in FIGS. 1A and 1B. In at least some embodiments, the cord(s) 128 may be used to tether the dock 100 to an external structure to hinder or prevent removable of the dock from the external structure (e.g., a vehicle, platform, or the like).

In at least some embodiments, the guide pins 127 facilitate the alignment of electronic device 150 in the dock 100 or alignment of the contacts on the electronic device 150 or case 152 with the contacts 126 of the dock 100. The dock 100 can include any number of guide pins 127 such as, for example, one, two, three, four, or more guide pins.

In conventional docks, the guide pins are typically made of brass, steel, other metals, or hard plastic. The dock and attached electronic device are often subject to substantial shaking, vibration, or shock, particularly when the dock and electronic device are attached to a vehicle, such as a truck, car, motorcycle, bicycle, boat, airplane, or the like. It is found that the shaking, vibration, or shock (or even just repeated insertion and removal of the electronic device from the dock) results in wear on the guide pins of the dock or the guide holes in the electronic device where the guide pins are inserted. For example, metal guide pins can wear down the material around the guide holes of the electronic device. Over time a powdery residue may build up due to the wear. Moreover, the guide pins and guide holes often experience a looser fit over time due to the wear. This looser fit may result in poor alignment of the contacts 126 of the dock 100 with the contacts of the electronic device 150 or case 152 or additional movement due to shaking, vibration, or shock (and further wearing of the guide pins or guide holes.)

In many conventional designs, the guide pins are mounted on the same printed circuit board as the contacts. In these conventional designs, the shaking and vibration may be transferred from the guide pins to the printed circuit board which can also have deleterious effects including misalignment. The insertion of the guide pins into the guide holes may also result in pressure against the printed circuit board which can shift the depth or position of the contacts. Moreover, the insertion of the guide pins into the guide holes may damage the guide pins (for example, break the guide pins, especially if made of rigid plastic.)

Figure 3C:
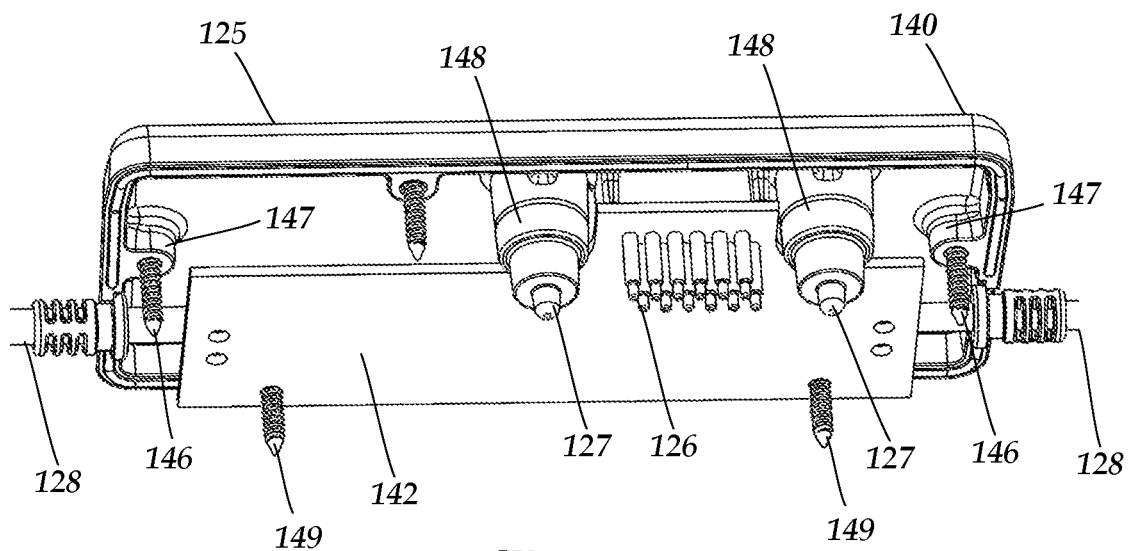
FIG. 3C is a schematic perspective view of the contact box of the dock of FIG. 1A with the remainder of the dock removed, according to the invention.
Figure 3A:
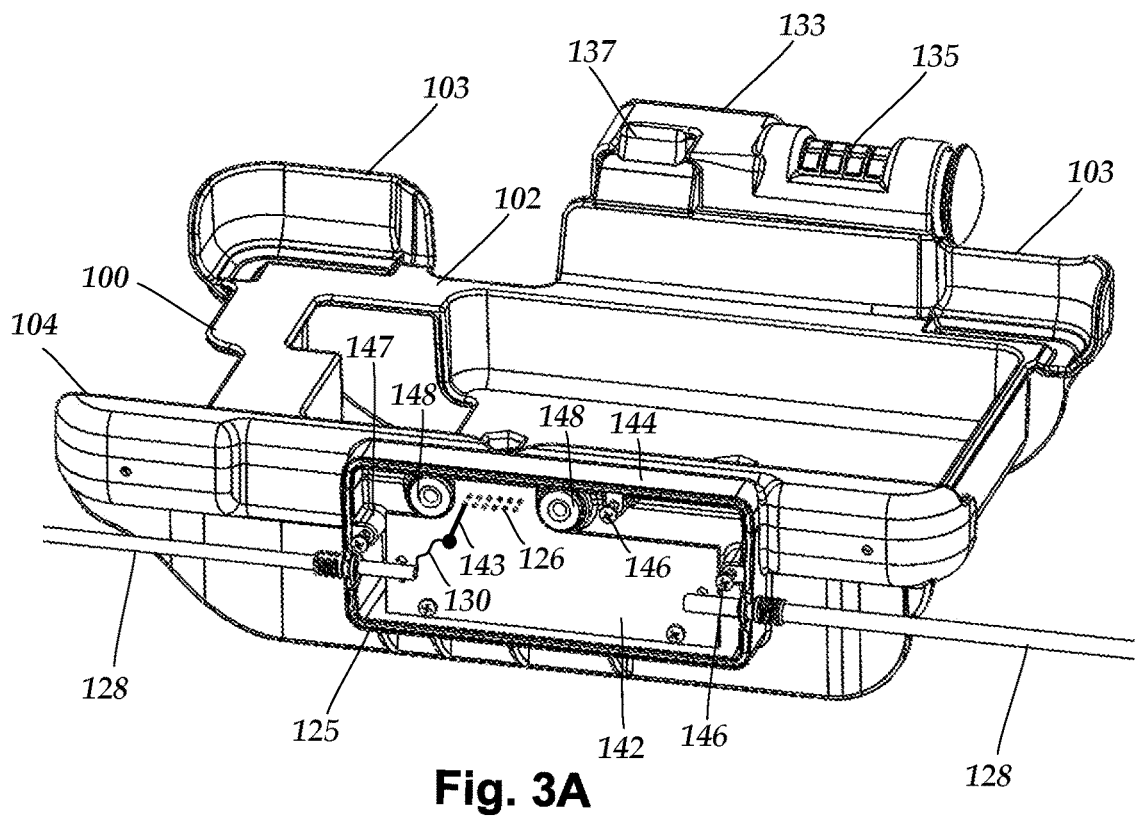
FIG. 3A is a schematic perspective bottom side view of the dock of FIG. 1A with a cover of a contact box of the dock removed, according to the invention.
Figure 3B:
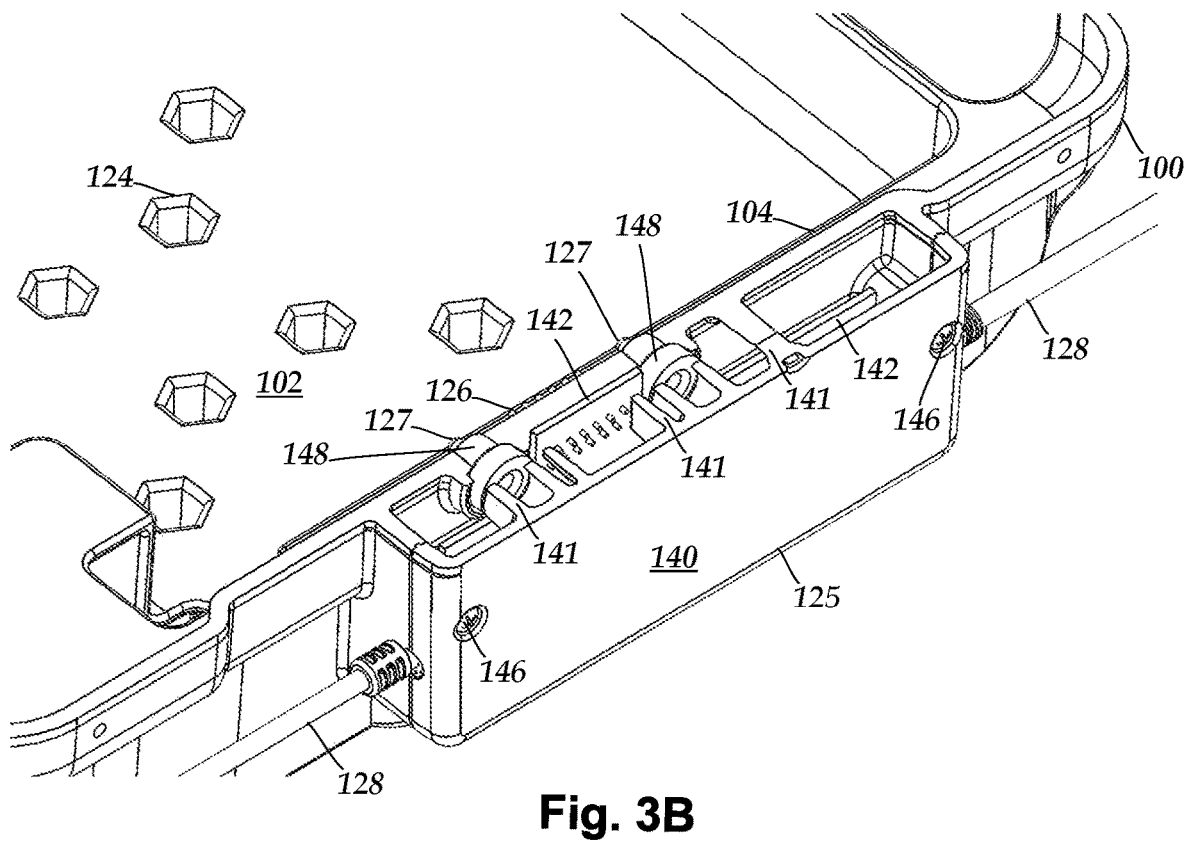
FIG. 3B is a schematic close-up, cross-sectional view of the contact box and surrounding components of the dock of FIG. 1A, according to the invention.

The contact box 125 includes a cover 140. FIG. 3A illustrates the dock 100 with the cover 140 of the contact box 125 removed. FIG. 3B is a cross-sectional view of the contact box 125. FIG. 3C is a view of the contact box 125 and associated components removed from the tray 104 and base 102 of the dock 100. In at least some embodiments, inside the contact box 125 are the contacts 126, the guide pins 127, the cords 128, and a printed circuit board (PCB) 142. The contacts 126 are attached to the PCB 142. The PCB 142 optionally includes traces 143 (only one of which is shown in FIG. 3B for clarity of illustration) to connect the contacts 126 to the wires 130 (only one of which is shown in FIG. 3B for clarity of illustration) extending from the cord(s) 128. In other embodiments, the wires 130 can be attached directly to the contacts 126.

The contact box 125 also includes a sidewall structure 144 and fasteners 146, such as screws, to attach the sidewall structure 144 and the cover 140 of the contact box 125 to the tray 104 or base 102 (FIGS. 1A and 1B) of the dock 100. In at least some embodiments, one or more of the sidewall structures 144, cover 140, base 102, or tray 104 include fastener guides 147. In at least some embodiments, the sidewall structure 144 or a portion of the sidewall structure is contiguous with the base 102, tray 104, or both (see, FIG. 3B). The contact box 125 may also include fasteners 149 (FIG. 3B) for fastening the PCB 144 to the tray 104, base 102, or cover 140 or any combination thereof.

In at least some embodiments, each of the guide pins 127 is attached to a support structure 148 that is disposed within the contact box 125 while the guide pins 127 extend through openings 131 in the tray 104 for insertion into the guide holes in the electronic device 150. The guide pin 127 and support structure 148 can be attached to each other or can form a single, undivided piece. In at least some embodiments, the guide pins 127, and optionally some or all of the support structure 148, are made of an elastomeric material. The use of elastomeric material can reduce or eliminate wear of the guide pins 127 or guide holes in the electronic device 150 because the guide pins are softer than the material around the guide holes and softer than conventional guide pins made of metal or rigid plastic. In at least some embodiments, the elastomeric guide pins 127 are also less likely to break than the conventional guide pins described above because the elastomeric guide pins 127 are not rigid. In at least some embodiments, the elastomeric guide pins 127 may also absorb some or all of the vibration, shaking, or shock. In at least some embodiments, the elastomeric guide pins 127 may also be easier to replace (particularly, if the guide pins 127 are independent of the PCB 142, as described below.) In at least some embodiments, the guide pins 127 have a durometer in a range of 40-90 Shore A or the equivalent. In at least some embodiments, the guide pins 127 are made of elastomeric polyurethane.

In at least some embodiments, the guide pin 127 or support structure 148 (or both) are hollow, as illustrated in FIG. 3B. The elastomeric materials and optional hollowing can facilitate flexing of the guide pins 127 to reduce or eliminate wear of the guide pins or guide holes and maintain alignment of the contacts 126 with the contacts on the electronic device 150 or case 152.

In at least some embodiments, the guide pin 127 and support structures 148 are not attached to the PCB 142 to maintain structural independence of the guide pins and printed circuit board. In at least some embodiments, inserting the guide pins 127 into the guide holes produces little pressure or impact from the guide pins on the PCB 142 and the contacts 126. In at least some embodiments, the guide pins 127 are held in place by the cover 140 of the contact box 125, as illustrated in FIG. 3B. In at least some embodiments, extensions 141 of the cover 140 push against the support structures 148 to hold the guide pins in place. In at least some embodiments, some of the extensions 141 also push against the PCB 142, as illustrated in FIG. 3B, to hold the PCB 142 and contact 125 in place. Instead of the extensions 141 or the cover 140, in at least some embodiments, the guide pins 127 and optional support structures 148 are attached to the contact box 125 or tray 104 (or the PCB 142 if the guide pins are not independent of the PCB) by fasteners or keepers or the like or any combination thereof.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. A dock for an electronic device, the dock comprising:
   a base configured to fit over at least a portion of a back surface of the electronic device;
   a tray extending from the base for receiving one side of the electronic device;
   a contact box attached to at least one of the base or the tray;
   a plurality of contacts extending from the contact box through one or more openings in the tray; and
   at least one guide pin extending from the contact box through one or more openings in the tray and configured for insertion into guide holes of the electronic device or a case containing the electronic device for alignment of contacts on the electronic device or the case with the contacts of the dock, wherein each of the at least one guide pin is elastomeric.

2. The dock of claim 1, further comprising a printed circuit board (PCB), wherein the contacts are attached to the PCB.

3. The dock of claim 2, wherein each of the at least one guide pin is not attached to the PCB.

4. The dock of claim 1, further comprising at least one support structure, wherein each of the at least one support structure is attached to a different one of the at least one guide pin.

5. The dock of claim 4, wherein the at least one support structure is elastomeric.

6. The dock of claim 4, wherein the at least one support structure is hollow.

7. The dock of claim 4, wherein the contact box comprises a cover.

8. The dock of claim 7, wherein the cover of the contact box, when attached to the contact box, presses against the at least one support structure to facilitate extension of the at least one guide pin from the contact box.

9. A dock for an electronic device, the dock comprising:
   a base configured to fit over at least a portion of a back surface of the electronic device;
   a tray extending from the base for receiving one side of the electronic device;
   a contact box attached to at least one of the base or the tray, wherein the contact box comprises a cover;
   a plurality of contacts extending from the contact box through one or more openings in the tray; and
   at least one guide pin extending from the contact box through one or more openings in the tray, wherein each of the at least one guide pin is elastomeric;
   at least one support structure, wherein each of the at least one support structure is attached to a different one of the at least one guide pin; and
   a printed circuit board (PCB), wherein the contacts are attached to the PCB, wherein the cover of the contact box, when attached to the contact box, presses against the PCB to facilitate extension of the contacts from the contact box.

10. The dock of claim 1, wherein each of the at least one guide pin is made of polyurethane.

11. The dock of claim 1, wherein each of the at least one guide pin is made of an elastomer having a durometer in a range of 40 to 90 Shore A.

12. A dock for an electronic device, the dock comprising:
   a base configured to fit over at least a portion of a back surface of the electronic device;
   a tray extending from the base for receiving one side of the electronic device;
   a contact box attached to at least one of the base or the tray;
   a printed circuit board (PCB) disposed within the contact box;
   a plurality of contacts attached to the PCB and extending from the contact box through one or more openings in the tray; and at least one guide pin extending from the contact box through one or more openings in the tray, wherein each of the at least one guide pin is not attached to the PCB.

13. The dock of claim 12, further comprising at least one support structure, wherein each of the at least one support structure is attached to a different one of the at least one guide pin.

14. The dock of claim 13, wherein the at least one support structure is elastomeric.

15. The dock of claim 13, wherein the at least one support structure is hollow.

16. The dock of claim 13, wherein the contact box comprises a cover.

17. The dock of claim 16, wherein the cover of the contact box, when attached to the contact box, presses against the at least one support structure to facilitate extension of the at least one guide pin from the contact box.

18. The dock of claim 16, wherein the cover of the contact box, when attached to the contact box, presses against the PCB to facilitate extension of the contacts from the contact box.

19. The dock of claim 12, wherein each of the at least one guide pin is made of polyurethane.

20. The dock of claim 12, wherein each of the at least one guide pin is made of an elastomer having a durometer in a range of 40 to 90 Shore A.

* * * * *